Figure 1:
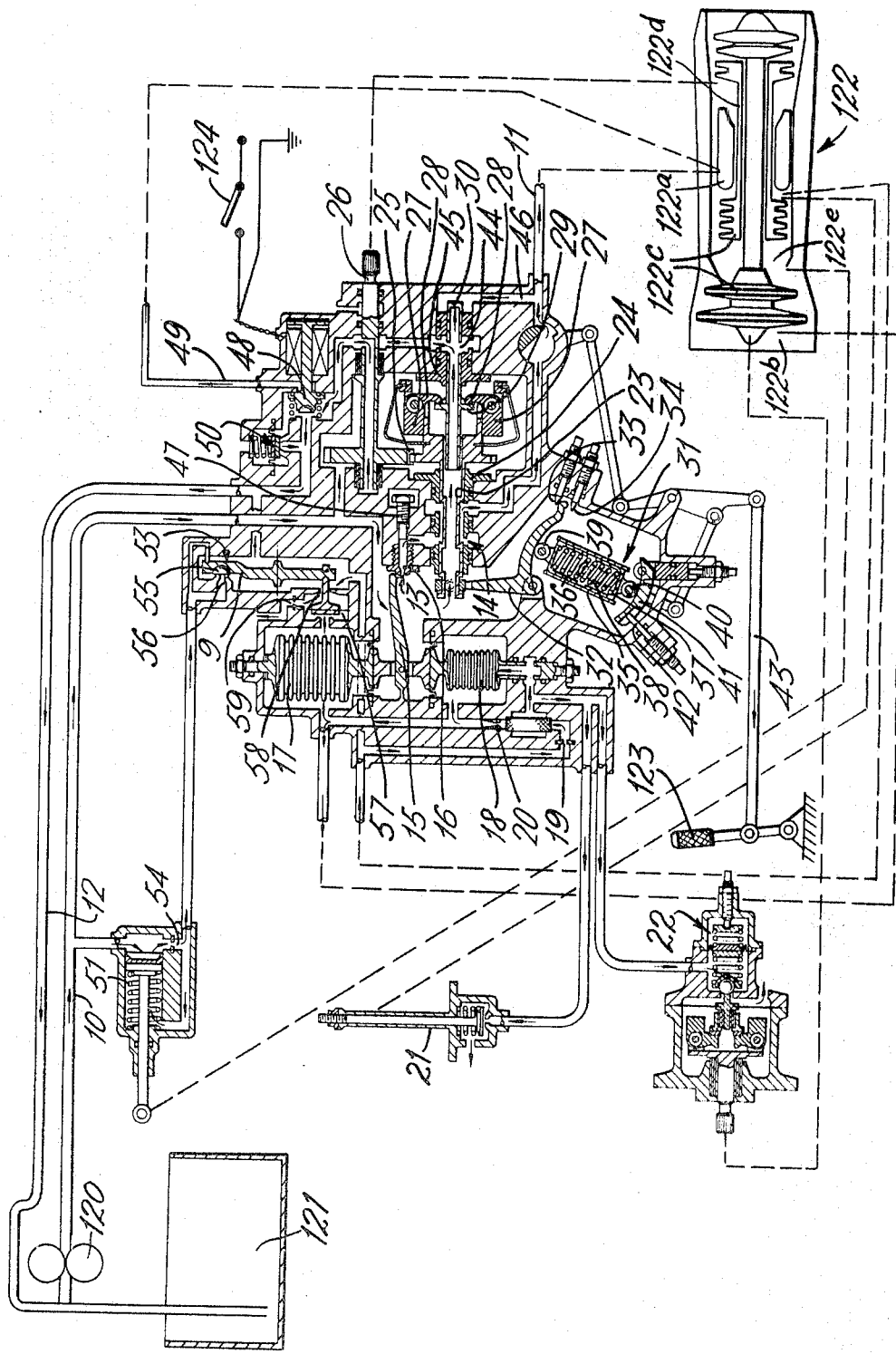

United States Patent

[11] 3,595,017

| [72] | Inventor | Joseph Lewis Bloom<br>Baie D'urfe, Quebec, Canada |
|---|---|---|
| [21] | Appl. No. | 806,095 |
| [22] | Filed | Mar. 11, 1969 |
| [45] | Patented | July 27, 1971 |
| [73] | Assignee | Joseph Lucas (Industries) Limited<br>Birmingham, England |

[54] FUEL CONTROL SYSTEMS FOR GAS TURBINE ENGINES
1 Claim, 2 Drawing Figs.

| [52] | U.S. Cl. | 60/39.28 |
|---|---|---|
| [51] | Int. Cl. | F02c 9/08,<br>F02c 9/10 |
| [50] | Field of Search | 60/39.28 T,<br>39.29 |

[56] References Cited
UNITED STATES PATENTS

| 2,846,846 | 8/1958 | Mock | 60/39.28 T |
| 2,848,870 | 8/1958 | Eastman | 60/39.28 |
| 2,939,280 | 6/1960 | Farkas | 60/39.28 |
| 2,989,849 | 6/1961 | Torell et al. | 60/39.28 |
| 3,017,922 | 1/1962 | Peterson | 60/39.28 X |
| 3,073,329 | 1/1963 | Kast | 60/39.28 X |
| 3,172,259 | 3/1965 | North, Jr. | 60/39.29 X |
| 3,438,199 | 4/1969 | McGinnis et al. | 60/39.28 |
| 3,475,908 | 11/1969 | Warne | 60/39.28 |

*Primary Examiner*—Al Lawrence Smith
*Attorney*—Holman & Stern

ABSTRACT: A fuel control system operates by restricting fuel flow by means of two variable restrictors in series, ad by spilling the remaining fuel via a spill valve to a return line. The first restrictor is variable by apparatus sensitive to changes of air pressure at the compressor of the engine with which the system is used. The second restrictor is variable both by a force which is a function of the desired speed of the engine and by a device which is sensitive to engine speed and which opposes the said force as engine speed increases. The spill valve is acted upon by fuel pressure upstream of the first restrictor so as to tend to increase fuel spillage, and by a device sensitive to engine speed and by fuel pressure downstream of the second restrictor so as to tend to reduce fuel spillage. The two restrictors are aligned orifices opening into an unobstructed chamber which lies between them, the orifices being controlled by blades engaging the sides of their respective orifices remote from the chamber.

FUEL CONTROL SYSTEMS FOR GAS TURBINE ENGINES

This invention relates to fuel control systems for gas turbine engines and has as an object to provide a fuel control system in a convenient form.

A fuel control system in accordance with the invention comprises a first fuel flow restrictor variable by means of a device sensitive to air pressure variations at the compressor of the engine with which the system is used, a second fuel flow restrictor connected in series with said first restrictor and incorporating a control element movable in one direction to decrease fuel flow by means of a device sensitive to the speed of the engine, and in the opposite direction by means of a device for applying a variable force to said control element in accordance with the desired speed of the engine, and a valve member for controlling the fuel pressure drop across said first and second restrictors in series by spilling fuel from the upstream side of the first restrictor, said valve member being acted upon by the speed sensitive device and by the pressure of fuel on the downstream side of said second restrictor, to urge said valve member in a direction to restrict spillage of fuel, and by the pressure of fuel on the upstream side of the first restrictor to urge the valve member in the opposite direction.

Figure 2:
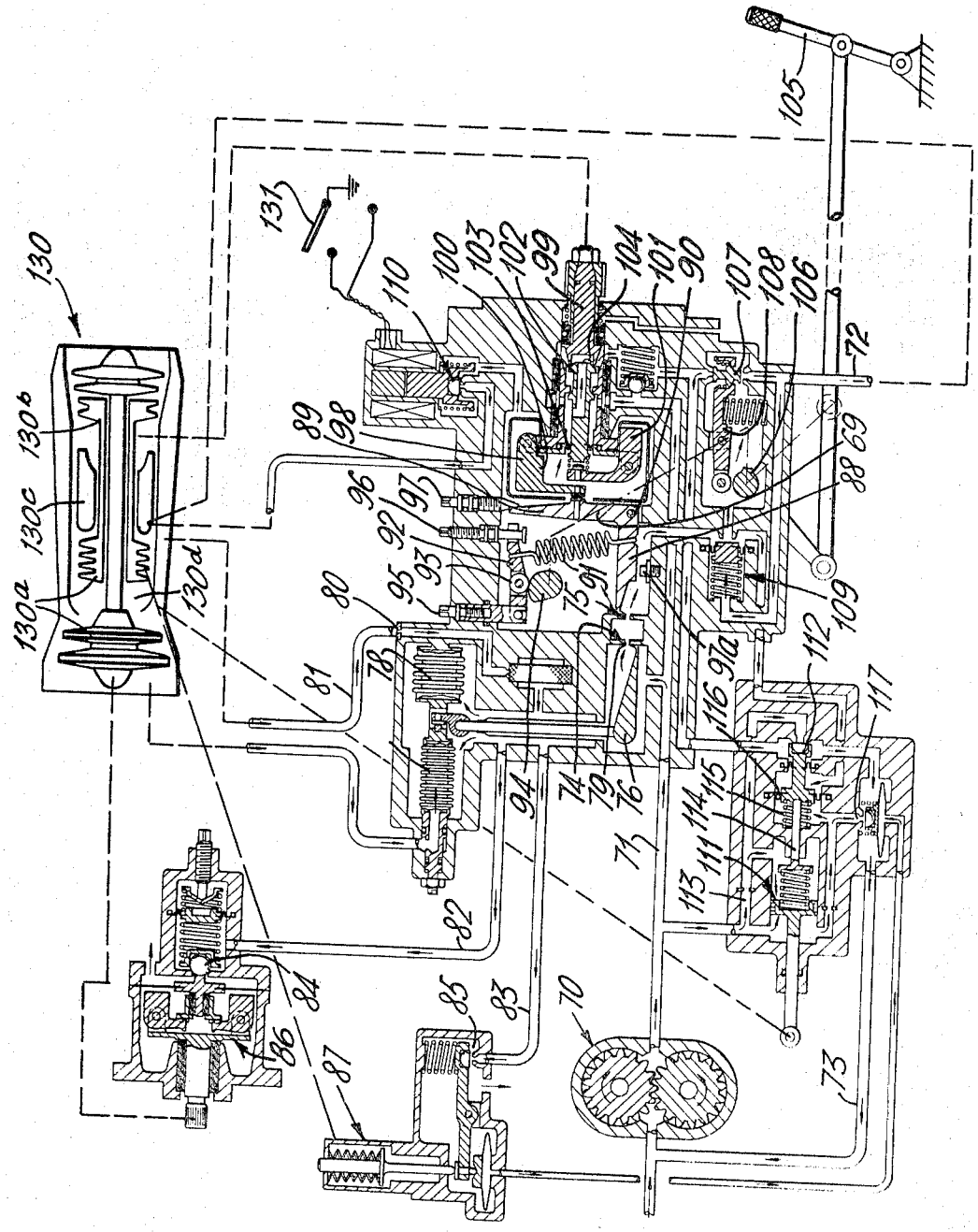

In the accompanying drawings FIG. 1 shows diagrammatically one example of a fuel control system in accordance with the invention. FIG. 2 shows diagrammatically an alternative arrangement.

The example shown in FIG. 1 makes use of a fixed displacement pump 120 which is driven by the engine and which delivers fuel from a tank 121 to the fuel line 10. The system operates by restricting the flow of fuel from the line 10 to the output connection 11 of the system which is connected to the sprayers 122a of the engine 122 with which the system is used. Remaining fuel is spilled to the return fuel line 12.

The fuel flow to the connection 11 is controlled by first and second restrictors 13, 14 in series. The restrictor 13 is variable by means of a control member in the form of a blade 15 movable to cover more or less of the orifice 16 by a pair of sealed bellows 17, 18. The bellows 17 is evacuated and is acted upon externally by the pressure of air tapped from the inlet 122b of the engine. The bellows 18 is acted upon externally by the inlet pressure but is supplied internally with air at a pressure derived from the pressure immediately downstream of the compressor 122c of the engine. The air pressure in the interior of the bellows 18 is obtained from an air orifice system 19, 20 in a line between a tapping from immediately downstream of the compressor and the tapping from the inlet 122b. The size of the orifices 19 and 20 are selected so that the air pressure between said orifices and within the bellows 18 is a known proportion of the pressure rise across the compressor. The blade 15 thus resides at a position dependent on the prevailing inlet pressure, which is dependent in turn on both altitude and forward speed, and on the pressure rise across the compressor. Reduction of the air pressure within the bellows 18 can be accomplished when required by a temperature sensitive valve 21 and, in the example shown, by a fan overspeed governor 22, the system illustrated being intended for a twin spool engine.

The second restrictor 14 is controlled by a hollow rotating control element 23 having a land which covers to a greater or lesser extent ports through which fuel can enter a nonrotary sleeve 24. The control element 23 is driven by gearing 25 from an input shaft 26 coupled to the engine shaft 122d. The element 23 is axially movable relative to the sleeve 24 and the gearing 25 is such as to permit such axial movement.

For urging the element 23 in one axial direction to increase the extent to which the ports in the sleeve 24 are covered, there is a device sensitive to the rotary speed of the element 23 and hence to the engine speed. This device comprises spring-loaded weights 27 pivotally mounted on the element 23 and provided with horns 28 which react against a flange 29 on a valve member 30 to be described hereinafter.

For urging the element 23 in the opposite direction there is provided a device 31 controlled by the throttle lever 123. This device 31 includes a pivoted lever 32 which, at one end, is forked and pivoted to a ring engaging a shoulder on the element 23. The other arm of this lever 32 is of arcuate shape and terminates in a portion engageable between adjustable stops 33, 34. A sleeve 35 is mounted for pivotal movement about the axis of the arcuate arm of the lever 32 when this is approximately midway between its limiting positions as defined by the stops 33, 34. The sleeve 35 contains a pair of sliding cup elements 36, 37 which contain between them a compression spring 38. The cup element 36 carries a roller 39 running on the arcuate arm of the lever 32 and the cup element 37 carries a similar roller 40 on an adjustable cam 41. This cam 41 is pivoted at one end and engages an adjustable abutment 42 at its other end. The pivot of the cam 41 can be displaced radially towards and away from the axis about which the sleeve 35 can be turned. The sleeve 35 is coupled to the throttle linkage 43 so that the angular position of the sleeve can be varied thereby.

It will be appreciated that the axial force applied to the element 23 by the device 31 will depend upon the angular position of the sleeve 35 and will increase as the sleeve is turned in a clockwise direction as viewed in the drawing.

As mentioned above the horns 28 on the weights 27 react against a flange 29 on the valve member 30. This valve member 30 controls the pressure drop across the restrictors 13, 14 in series in accordance with the speed of the engine. To this end the interior of the valve member 30 communicates with the upstream side of the restrictor 13 via the interior of the element 23. The member 30 has ports 44 which are covered to a greater or lesser extent by a fixed sleeve 45 surrounding the valve member 30. A passage 46 carries fuel from the outlet connection 11 such that the resultant pressure force acting on the valve member 30 is in opposition to the force dictated by the weights 27 on rotation thereof. When the force generated by the rotating weights is greater than the opposing pressure force acting on the valve member 30 the said valve moves in a direction to cause the ports 44 to be covered to a greater extent and vice versa.

During normal running, therefore, the valve member 30 will take up an equilibrium position such that the net axial force applied to it is as a result of the fuel pressure drop through the restrictors exactly balances the force applied to it by the weights 27. The equilibrium position of the control element 23 depends upon the force applied by the device 31, the force applied by the weights 27 and the position of the valve member 30. As a result, in equilibrium conditions there will be a precisely defined rate of flow of fuel to the engine corresponding to each position of the throttle lever. Such flow rate will also be rendered variable in accordance with variations of atmospheric pressure with altitude by automatic adjustment of the blade 15.

When the throttle lever is moved to a new position the rates at which acceleration and deceleration take place are controlled by the blade 15. During rapid acceleration, for example, the element 23 is displaced by the device 31 to an extreme position in which the restrictor 14 is fully open, fine adjustment of this position being obtainable by adjustment of the stop 33. The rate of acceleration is limited by movement of the blade 15 resulting from variations in the compressor output pressure. When the desired speed is reached the weights 27 generate a reaction force at their pivot centers greater than that given by the device 31 and act to move the element 23 out of its limiting position, thereby reducing the fuel flow to cease acceleration.

The system shown also includes an adjustable restrictor 47 in the fuel passage between the restrictors 13 and 14. This restrictor 47 is adjusted to suit the particular fuel to be used in the system.

For starting the engine a solenoid valve 48 is actuated by a switch 124 to close the normal fuel return passage from the valve 30 to the return line 12 and to open a passage 49 to the starting sprayers also shown at 122a of the engine. A simple pressure regulator 50 incorporating a spring-loaded diaphragm controls the pressure of the fuel supplied to the starting sprayers.

To prevent stalling of the compressor the system includes an arrangement for actuating a valve 122e for bleeding off air from the compressor. This arrangement includes a spring-loaded piston and cylinder unit 51. One end of this unit is connected to the fuel line 10 and the other end is connected to a control valve 53. An orifice-controlled passage 54 interconnects the two ends of the unit. The control valves 53 includes a lever 9 with a closure 55 which coacts with a seat 56. The lever is movable by a diaphragm 57 exposed on one side to the compressor intake pressure and on the other side to a pressure derived from the compressor output pressure. Such pressure is derived by causing air from the compressor output to pass through an orifice 58 before acting on the diaphragm whilst permitting air to escape to atmosphere through an orifice 59. When the valve 53 is shut there is no flow through the orifice 54 so that both sides of the piston experience the same fuel pressure. When the compressor output pressure rises sufficiently to open the valve 53, however, the flow through the orifice 54 establishes a pressure difference across the piston of unit 51. At a predetermined air pressure rise through the compressor the pressure difference across the piston will be sufficient to cause the piston to be displaced against its spring loading to actuate the bleed valve.

In the alternative arrangement shown in FIG. 2 a pump 70 driven by the engine 130 delivers fuel to the line 71. The system operates by restricting fuel flow from the line 71 to the output line 72 and by spilling the remaining fuel to the return line 73 in a like manner to the example described with reference to FIG. 1.

The fuel flow to the line 72 is controlled by first and second restrictors 74, 75 in series. The restrictor 74 is variable by means of a blade 76 movable by a pair of sealed bellows 77, 78 to cover more or less of an orifice 79. The bellows 78 is evacuated and the bellows 77 is operated on internally by the inlet pressure of the compressor 130a. Both the bellows 77, 78 are operated on externally by air at a pressure derived from flow through a restrictor 80 in a line 81 between a tapping from immediately downstream of the compressor and two lines 82, 83 which terminate in valves 84, 85 respectively. Valve 84 is acted on by a fan overspeed governor 86 and valve 85 by a temperature sensor 87. The air surrounding the bellows 77, 78 therefore ranges from the full compressor outlet pressure when the valves 84, 85 are shut to atmospheric pressure when they are open. The blade 76 is thus positioned by the same quantities, namely inlet pressure and the pressure rise through the compressor, as the corresponding blade in the example described with reference to FIG. 1.

The second restrictor 75 is variable by a control element 69 rotatable about a pivot 90 and which includes a blade 88 and a portion 89 extending therefrom. As shown, restrictors 74, 75 are aligned and open into an unobstructed chamber which lies between them, the blades 76, 88 engaging sides of their associated orifices remote from the chamber. The control element 69 is urged in one direction by a spring 91 engaged at one end with the control element and at the other end with a lever 92. The lever 92 has a rolling pivot 93 which is supported by an edge cam 94 rotatable by a throttle lever 105. Adjustable stops 95, 96 enable upper and lower limits respectively to be set for the force exerted by the spring 91 on the control element 69. Adjustable stops 97, 97a enable maximum and minimum openings respectively to be set for the restrictor 75.

For urging the control element 69 in the other direction there is a device 98 sensitive to rotary speed and mounted on a shaft 99 having an axial bore and driven by a shaft 130b of the engine. The device 98 comprises spring-load weights 100, 101 pivotally mounted on the shaft 99. The weight 100 acts against the control element 69 and the weight 101 acts via a spring against a valve member 102 having pistonlike flanges and lying largely within the bore of the shaft 99. The said bore is sealed from the outside of the shaft 99 by a diaphragm 103 which extends between the shaft 99 and the valve member 102. The bore has at its inner end a port 104 in which the valve member 102 seats at one extremity of its travel. The port 104 communicates with the fuel return line 73. The valve member 102 itself includes an axial bore which communicates via the bore of the shaft 99 with the upstream side of the first restrictor 74. The valve member 102 is urged in one direction by the pressure of the fuel in line 71 and in the other direction by the pressure of the fuel which has passed through the restrictors 74, 75 and by the force exerted via the spring by the weight 101 when rotating. The valve member 102 will therefore take up an equilibrium position when the net force applied by the fuel is equal to the force applied by the rotating weight 101, and will therefore control the pressure drop across the restrictors 74, 75 in series in a like manner to that described in the preceding example. The equilibrium position of the control element 69 depends upon the force applied by the spring 91 and the force applied by the weights 100. In equilibrium conditions, therefore, there will be a precisely defined rate of flow of fuel to the engine corresponding to each position of the throttle lever, and this rate of flow will also be variable in accordance with variations of atmospheric pressure with altitude, by adjustment of the blade 76.

The throttle lever 105 controls a second cam 106 which operates a two-way valve 107 via a lever 108. In the shutoff position of the lever 105 the valve 107 allows fuel flow through the restrictors 74, 75 to return to the line 73. In all other positions of the lever 105 this fuel passes to the engine via line 72. A minimum pressure valve 109 ensures that the fuel supply to the engine does not fall below 100 p.s.i.

For starting the engine a solenoid valve 110 operated by a switch 131 allows a flow of fuel from downstream of the restrictors 74, 75 to pass to starting sprayers in combustion chambers 130c.

To prevent stalling of the compressor the system includes an arrangement for actuating a valve 130d for bleeding of air from the output side of the compressor. This arrangement includes a spring-loaded piston and cylinder unit 111. One end of this unit is connected to the fuel line 71 and the other end to a servocontrol valve 112. An orifice-controlled passage 113 interconnects the two ends of the unit 111. The control valve 112 is connected via a spindle 114 to the spring of the unit 111 and is urged to a shut position both by the said spring and by a spring 115. The valve 112 is movable against the springs by a diaphragm 116 exposed on one side to the fuel pressure downstream of the restrictors 74, 75 and on the other side to a pressure downstream of the passage 113. The flow through the passage 113 is regulated both by the valve 112 and by a bleed orifice 117 controlled by the temperature sensor 87. As engine speed increases, so does the fuel pressure downstream of the restrictors 74, 75, and this pressure acts on the diaphragm 116 to open the valve 112. Flow through the passage 113 increases and the consequent increased pressure drop across the piston unit 111 urges it against the spring in a direction to close the compressor bleed valve. Movement in this direction also tends to close the valve 112. An equilibrium condition for the piston unit 111, and hence for the compressor bleed valve, therefore exists for any combination of engine speed, compressor inlet temperature, and pressure rise through the compressor.

Having thus described our invention what we claim as new and desire to secure by Letters Patent is:

1. A fuel control system for a gas turbine engine comprising a first fuel flow restrictor incorporating an orifice and a blade control member movable by means of a device sensitive to air pressure variations at the compressor of the engine, a second fuel flow restrictor connected in series with said first restrictor and incorporating an orifice and a blade control element movable in one direction to decrease fuel flow by means of a governor device mounted on a shaft driven by the engine, and in the opposite direction by means of a device for applying a variable force to said control element in accordance with the desired speed of the engine, an unobstructed chamber into which both the said orifices open, and a valve member for controlling the fuel pressure drop across said first and second restrictors in series by spilling fuel from the upstream side of the first restrictor, said valve member being acted upon by the governor and by the pressure of fuel on the downstream side of said second restrictor to urge said valve member in a direction to restrict spillage of fuel, and by the pressure of fuel, on the upstream side of the first restrictor to urge the valve member in the opposite direction, the control member and control element engaging faces of their respective orifices remote from the chamber and said orifices being substantially aligned.